(12) United States Patent
Xue et al.

(10) Patent No.: US 11,523,431 B2
(45) Date of Patent: Dec. 6, 2022

(54) REUSE-ONE CHANNEL ACCESS FOR NEW RADIO COMMUNICATIONS IN UNLICENSED SPECTRUM

(71) Applicant: QUALCOMM Incorporated, San Diego, CA (US)

(72) Inventors: Yisheng Xue, San Diego, CA (US); Xiaoxia Zhang, San Diego, CA (US); Aleksandar Damnjanovic, Del Mar, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 16/990,724

(22) Filed: Aug. 11, 2020

(65) Prior Publication Data

US 2021/0051717 A1    Feb. 18, 2021

Related U.S. Application Data

(60) Provisional application No. 62/886,305, filed on Aug. 13, 2019.

(51) Int. Cl.
*H04W 74/08* (2009.01)
*H04W 74/00* (2009.01)
*H04W 72/04* (2009.01)

(52) U.S. Cl.
CPC ... *H04W 74/0808* (2013.01); *H04W 72/0453* (2013.01); *H04W 74/006* (2013.01); *H04W 74/008* (2013.01)

(58) Field of Classification Search
CPC ......... H04W 74/0808; H04W 72/0453; H04W 74/006; H04W 74/008; H04W 74/002; H04W 74/0866; H04W 72/0446; H04W 72/1205
See application file for complete search history.

(56) References Cited

U.S. PATENT DOCUMENTS

| | | | |
|---|---|---|---|
| 10,362,593 B2 | 7/2019 | Salem et al. | |
| 2011/0249627 A1* | 10/2011 | Stanwood | H04L 12/413 370/328 |
| 2017/0238334 A1* | 8/2017 | Yang | H04W 74/0808 370/336 |
| 2019/0090126 A1* | 3/2019 | Hayashi | H04W 74/02 |

FOREIGN PATENT DOCUMENTS

GB    2550200 A    11/2017

OTHER PUBLICATIONS

International Search Report and Written Opinion—PCT/US2020/045960—ISA/EPO—dated Oct. 23, 2020.

* cited by examiner

*Primary Examiner* — Thai Nguyen
(74) *Attorney, Agent, or Firm* — Patterson & Sheridan, LLP

(57) ABSTRACT

Certain aspects of the present disclosure provide techniques for reuse one channel access for new radio communications in unlicensed spectrum. A method that may be performed by a first base station (BS) includes occupying a bandwidth, based on a category 4 (CAT4) listen before talk (LBT) procedure on the bandwidth, wherein the CAT4 LBT procedure is based on a first contention window (CW); arranging a category 2 (CAT2) LBT occasion for the bandwidth during a channel occupancy time (COT) for the bandwidth; and receiving an indication that at least a second BS has occupied the bandwidth during the CAT2 LBT occasion.

30 Claims, 11 Drawing Sheets

REUSE-ONE CHANNEL ACCESS FOR NEW RADIO COMMUNICATIONS IN UNLICENSED SPECTRUM

CROSS-REFERENCE TO RELATED APPLICATION & PRIORITY CLAIM

This application claims benefit of and priority to U.S. Provisional Patent Application No. 62/886,305, filed Aug. 13, 2019, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques for channel access by new radio (NR) devices (e.g., base stations (BSs) and user equipments (UEs)) in a reuse-one architecture on unlicensed spectrum.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved frequency spectrum reuse in new radio (NR) wireless communications systems operating on unlicensed spectrum.

Certain aspects provide a method for wireless communication performed by a base station (BS). The method generally includes occupying a bandwidth, based on a category 4 (CAT4) listen before talk (LBT) procedure on the bandwidth, wherein the CAT4 LBT is based on a first contention window (CW); arranging a category 2 (CAT2) LBT occasion for the bandwidth during a channel occupancy time (COT) for the bandwidth; and receiving an indication that at least a first BS has occupied the bandwidth during the CAT2 LBT occasion.

Certain aspects provide a method for wireless communication performed by a base station (BS). The method generally includes performing a category 4 (CAT4) listen before talk (LBT) procedure on a bandwidth, based on a first contention window (CW); determining, based on the CAT4 LBT, that another node occupies the bandwidth; obtaining a notification that another BS has arranged a category 2 (CAT2) LBT occasion for the bandwidth during the COT; performing the CAT2 LBT on the bandwidth during the CAT2 LBT occasion; transmitting a signal on the bandwidth to occupy the bandwidth in response to performing the CAT2 LBT; and sending an indication to the other BS that the BS has occupied the bandwidth.

Certain aspects of the present disclosure provide an apparatus for wireless communications. The apparatus has a memory and a processor coupled with the memory, the memory and the processor configured to: occupy a bandwidth, based on a category 4 (CAT4) listen before talk (LBT) procedure on the bandwidth, wherein the CAT4 LBT procedure is based on a first contention window (CW); arrange a category 2 (CAT2) LBT occasion for the bandwidth during a channel occupancy time (COT) for the bandwidth; and receive an indication that at least a base station (BS) has occupied the bandwidth during the CAT2 LBT occasion.

Certain aspects of the present disclosure provide a base station (BS). The BS has a memory and a processor coupled with the memory, the memory and the processor configured to: perform a category 4 (CAT4) listen before talk (LBT) procedure on a bandwidth, based on a first contention window (CW); obtain a notification that another BS has arranged a category 2 (CAT2) LBT occasion for the bandwidth during a channel occupancy time (COT) for the bandwidth; occupy the bandwidth, based on the CAT2 LBT on the bandwidth during the CAT2 LBT occasion; and send an indication to the other BS that the BS has occupied the bandwidth.

Certain aspects provide an apparatus for wireless communication. The apparatus generally includes means for occupying a bandwidth, based on a category 4 (CAT4) listen before talk (LBT) procedure on the bandwidth, wherein the CAT4 LBT is based on a first contention window (CW); means for arranging a category 2 (CAT2) LBT occasion for the bandwidth during a channel occupancy time (COT) for the bandwidth; and means for receiving an indication that at least a base station (BS) has occupied the bandwidth during the CAT2 LBT occasion.

Certain aspects provide an apparatus for wireless communication. The apparatus generally includes means for performing a category 4 (CAT4) listen before talk (LBT) procedure on a bandwidth, based on a first contention window (CW); means for determining, based on the CAT4 LBT, that another node occupies the bandwidth; means for obtaining a notification that a base station (BS) has arranged a category 2 (CAT2) LBT occasion for the bandwidth during the COT; means for performing the CAT2 LBT on the bandwidth during the CAT2 LBT occasion; means for transmitting a signal on the bandwidth to occupy the bandwidth in response to performing the CAT2 LBT; and means for sending an indication to the BS that the apparatus has occupied the bandwidth.

Certain aspects of the present disclosure provide a computer-readable medium for wireless communications. The computer-readable medium has instructions that, when executed by a processing system, cause the processing system to: occupy a bandwidth, based on a category 4 (CAT4) listen before talk (LBT) procedure on the bandwidth, wherein the CAT4 LBT procedure is based on a first contention window (CW); arrange a category 2 (CAT2) LBT occasion for the bandwidth during a channel occupancy time (COT) for the bandwidth; and receive an indication that at least a base station (BS) has occupied the bandwidth during the CAT2 LBT occasion.

Certain aspects of the present disclosure provide a computer-readable medium for wireless communications. The computer-readable medium has instructions that, when executed by a processing system, cause the processing system to: perform a category 4 (CAT4) listen before talk (LBT) procedure on a bandwidth, based on a first contention window (CW); obtain a notification that another BS has arranged a category 2 (CAT2) LBT occasion for the bandwidth during a channel occupancy time (COT) for the bandwidth; occupy the bandwidth, based on the CAT2 LBT on the bandwidth during the CAT2 LBT occasion; and send an indication to the other BS that the BS has occupied the bandwidth.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
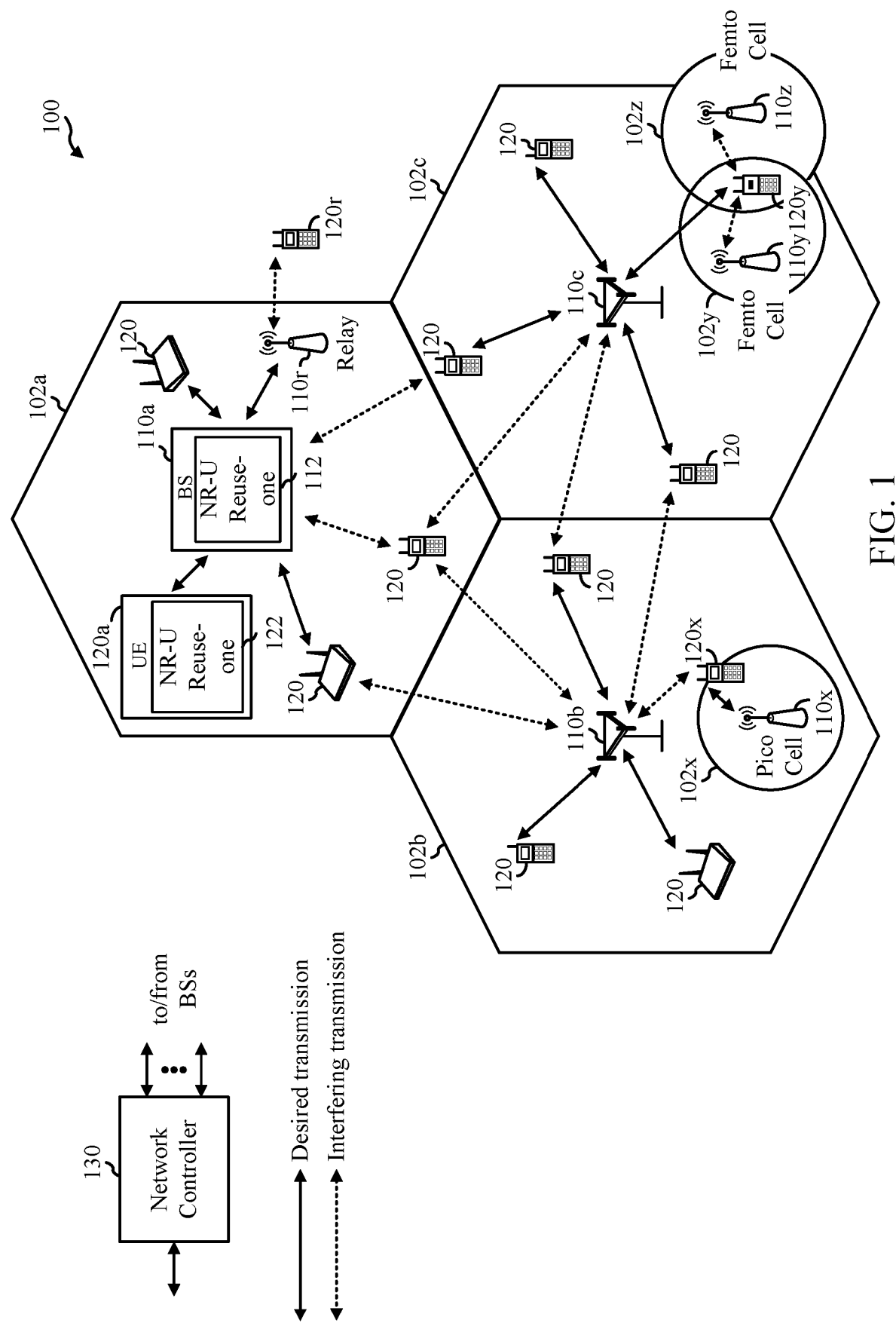
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) base stations (BSs) to perform channel access on unlicensed spectrum in a reuse-one architecture while co-existing with Wi-Fi networks. To co-exist with Wi-Fi and other technologies in unlicensed spectrum, specifications (e.g., wireless communication specifications) for NR in unlicensed spectrum (NR-U) state that NR-U nodes should perform listen-before-talk (LBT) based channel access (i.e., check that other nodes are not transmitting on a bandwidth before transmitting on that bandwidth). For the sake of fairness between NR and Wi-Fi networks, the LBT mechanism in NR-U technology is very similar to that of Wi-Fi technology, although an NR-U network can be very different from a Wi-Fi network. For example, an NR-U network typically has a much better (e.g., higher bandwidth and lower latency) backhaul than a Wi-Fi network, an NR-U network supports high-accuracy synchronization among nodes, and an NR-U network has a rich set of interference management tools (e.g., CSI measurement and reporting). LBT in NR-U networks hinders reuse-one (i.e., reuse of a bandwidth by each cell in a cellular network) channel access, in typical deployments, even though an NR-U operator may conduct network planning similar to that for cellular deployments. Absence of reuse-one architecture may lead to seriously degraded system performance for NR-U networks.

According to aspects of the present disclosure, an enhanced LBT design is provided that facilitates reuse-one channel access in NR-U networks, with very promising co-existence (i.e., co-existing with legacy NR-U, licensed assisted access (LAA), or Wi-Fi technologies) performance.

The following description provides examples of channel access by new radio (NR) base stations in a reuse-one architecture on unlicensed spectrum in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

In aspects of the present disclosure, two or more of the BSs 110a, 110b, 110c, 110r, 110x, 110y, and 110z may be organized in a reuse-one cluster to compete, in parallel, for a channel occupancy time (COT) for a bandwidth (e.g., a bandwidth in unlicensed spectrum).

According to certain aspects, the BSs 110 and UEs 120 may be configured for channel access in a reuse-one architecture on unlicensed spectrum. As shown in FIG. 1, the BS 110a includes an NR-U reuse-one manager 112. The NR-U reuse one manager 112 may be configured to occupy a bandwidth, based on a category 4 (CAT4) listen before talk (LBT) procedure on the bandwidth, wherein the CAT4 LBT procedure is based on a first contention window (CW); to arrange a category 2 (CAT2) LBT occasion for the bandwidth during a channel occupancy time (COT) for the bandwidth; and to receive an indication that at least a first BS has occupied the bandwidth during the CAT2 LBT occasion, in accordance with aspects of the present disclosure. In some examples, the NR-U reuse-one manager 112 may determine, based on the condition and the CAT4 LBT, to execute a full reuse-one COT for the bandwidth; and report to a network entity (e.g., network controller 130) that the BS has determined to execute the full reuse-one COT for the bandwidth; and/or perform a coordinated rate control (RC) occasion (CRCO) with the at least the first BS. In some aspects, the NR-U reuse-one manager 112 may be configured to perform a category 4 (CAT4) listen before talk (LBT) procedure on a bandwidth, based on a first contention window (CW); to obtain a notification that another BS has arranged a category 2 (CAT2) LBT occasion for the bandwidth during a channel occupancy time (COT) for the bandwidth; to occupy the bandwidth, based on the CAT2 LBT on the bandwidth during the CAT2 LBT occasion; and to send an indication to the other BS that the BS has occupied the bandwidth. As shown in FIG. 1, the UE 120a includes an NR-U reuse-one manager 122. The NR-U reuse-one manager 122 may be configured to perform a coordinated rate control (RC) occasion (CRCO) with one or more BSs and zero or more other UEs, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
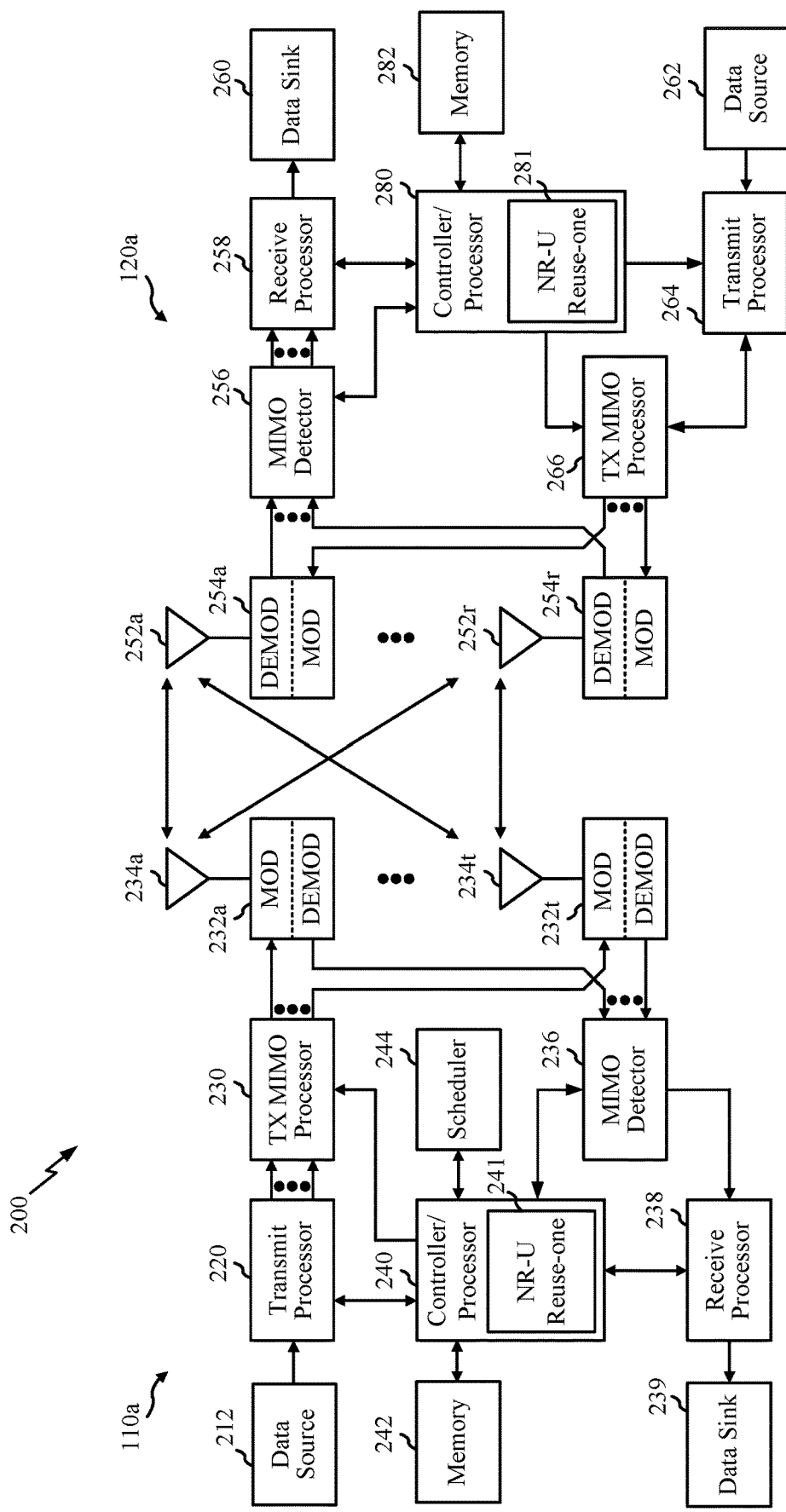
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has an NR-U reuse-one manager 241 that may be configured for occupying a bandwidth, based on a category 4 (CAT4) listen before talk (LBT) procedure on the bandwidth, wherein the CAT4 LBT procedure is based on a first contention window (CW); arranging a category 2 (CAT2) LBT occasion for the bandwidth during a channel occupancy time (COT) for the bandwidth; and receiving an indication that at least a first BS has occupied the bandwidth during the CAT2 LBT occasion, according to aspects described herein. In some aspects, the NR-U reuse-one manager 241 may be configured for performing a category 4 (CAT4) listen before talk (LBT) procedure on a bandwidth, based on a first contention window (CW); obtaining a notification that another BS has arranged a category 2 (CAT2) LBT occasion for the bandwidth during a channel occupancy time (COT) for the bandwidth; occupying the bandwidth, based on the CAT2 LBT on the bandwidth during the CAT2 LBT occasion; and sending an indication to the other BS that the BS has occupied the bandwidth. As shown in FIG. 2, the controller/processor 280 of the UE 120a has an NR-U reuse-one manager 241 that may be configured for performing a coordinated rate control (RC) occasion (CRCO) with one or more BSs and zero or more other UEs, according to aspects described herein. Although shown at the Controller/Processor, other components of the UE 120a and BS 110a may be used performing the operations described herein.

Figure 3:
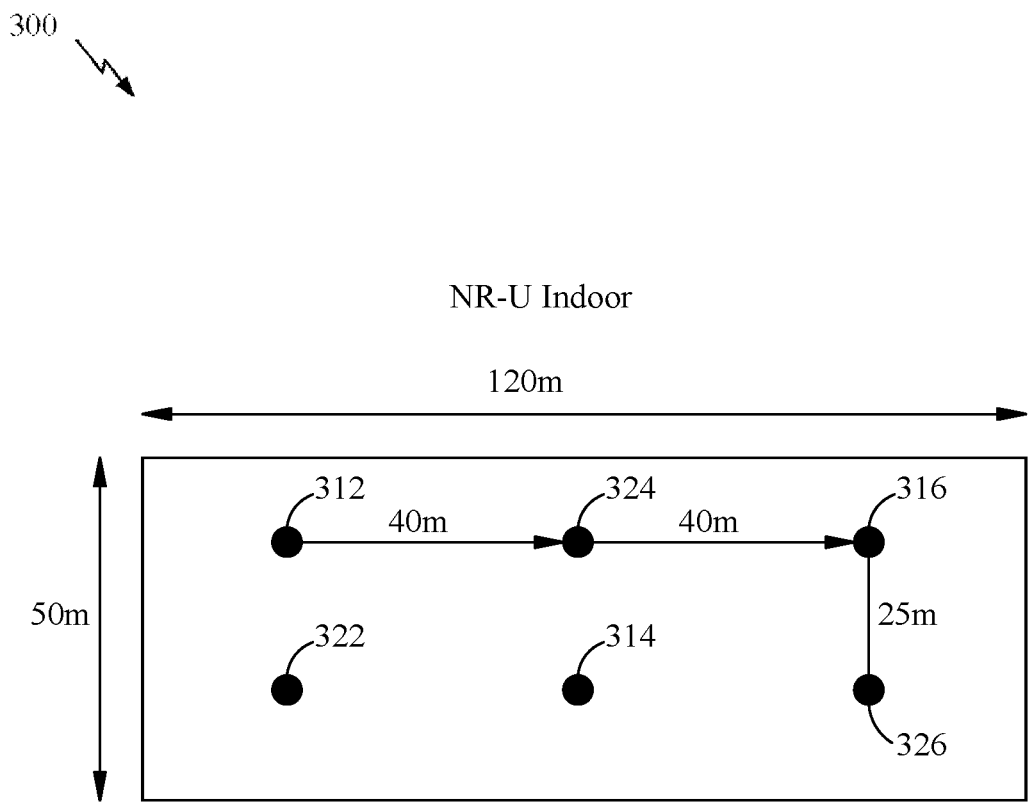
FIG. 3 is a schematic diagram of an exemplary indoor wireless communication network in which aspects of the present disclosure may be practiced.

FIG. 3 is a schematic diagram of an exemplary indoor wireless communication network 300 in which aspects of the present disclosure may be practiced. The exemplary communications network includes a first reuse-one cluster including BSs 312, 314, and 316 and a second reuse-one cluster including BSs 322, 324, and 326. The first reuse-one cluster is operated by a first operator, and the second reuse-one cluster is operated by a second operator. Also present are 15 UEs supported by each operator. The two clusters share a 40 MHz bandwidth (BW). Each BS and UE utilizes multiple-input multiple-output with four transmit antennas and four receive antennas (i.e., MIMO 4×4). The BSs have a peak 23 dBm transmit power. The traffic between the BSs and UEs is generally burst traffic with a 4 megabyte (MB) burst size. The two clusters are configured to use an LBT energy detection (ED) threshold of negative 72 dBm. Also, the BSs are configured to support a fully floating channel occupancy time (COT) starting point, i.e., a device can start a COT at any time, instead of being limited to starting a COT to particular times, such as frame start times in another network operating on licensed spectrum.

As previously described, use of LBT in the network 300 in FIG. 3 without using a reuse-one architecture may significantly negatively impact performance of the clusters. Accordingly, it is desirable to develop techniques and apparatus for channel access by NR devices in unlicensed spectrum.

Example Reuse One Channel Access for New
Radio Communications in Unlicensed Spectrum Aspects of the present disclosure provide techniques for channel access by new radio (NR) devices in a reuse-one architecture on unlicensed spectrum.

According to aspects of the present disclosure, an enhanced LBT design is provided that facilitates reuse-one channel access in NR-U networks, with very promising co-existence (i.e., co-existing with legacy NR-U, licensed assisted access (LAA), or Wi-Fi technologies) performance.

In aspects of the present disclosure, the provided enhanced LBT design allows for grouping or clustering of base stations to perform a cooperative LBT. That is, a plurality of BSs (e.g., next generation NodeBs (gNBs)) belonging to an operator are arranged (e.g., located and configured to cooperate) as a reuse-one cluster to compete, in parallel, for a channel occupancy time (COT) for a bandwidth (e.g., a bandwidth in unlicensed spectrum).

According to aspects of the present disclosure, a cluster of BSs may compete for a COT for a bandwidth by using category 4 (CAT4) LBT procedures, also referred to as CAT4 LBTs. A BS in the cluster first checking out a COT (i.e., first completing a CAT4 LBT) may be referred to as a leading BS or leading gNB.

In aspects of the present disclosure, a BS in the cluster first checking out a COT may arrange (e.g., configure and communicate to other BSs) a category 2 (CAT2) LBT occasion to share the checked-out COT with the other BSs in the reuse-one cluster. The leading gNB does not transmit anything during the CAT2 LBT occasion. Any other BS (i.e., any other BS in the reuse-one cluster), which may be referred to as a non-leading BS or a non-leading gNB, may attempt to join in the COT, based upon the outcome of a CAT2 LBT performed by that non-leading BS.

According to aspects of the present disclosure, BSs (e.g., gNBs) within a reuse-one cluster may cooperatively compete for a COT with different traffic directions, i.e., downlink (DL) or uplink (UL).

In aspects of the present disclosure, some UEs may not monitor DCIs from all BSs (e.g., gNBs) within the reuse-one cluster. For example, low-cost UEs may not be able to support 3 control resource sets (CORESETs) per bandwidth part (BWP), and a low-cost UE may not monitor DCIs transmitted in a CORESET in a BWP when the UE is not configured to support that CORESET.

According to aspects of the present disclosure, two or more BSs (e.g., gNBs) may be arranged to cooperatively compete for a COT in a bandwidth under network (NW) coordination. That is, a network entity, such as a central unit (CU), may send an LBT trigger to kick off independent, parallel CAT4 LBTs by the BSs, with independent random numbers for the CAT4 LBTs drawn by the BSs according to independent contention windows (CWs). The trigger also specifies one or more conditions for a full reuse-one COT for the bandwidth, such as at least two parallel transmissions occurring in a period on the bandwidth.

In aspects of the present disclosure, any BS in the cluster first checking out a COT may be named as the (temporally) leading BS.

According to aspects of the present disclosure, the leading BS occupies the channel (e.g., transmits a signal on the bandwidth) and arranges a CAT2 LBT occasion on the bandwidth for other BSs to join in on the COT.

In aspects of the present disclosure, any other BS of the cluster may be named as a non-leading BS.

According to aspects of the present disclosure, a non-leading BS of the cluster may conduct a CAT2 LBT during the CAT2 LBT occasion arranged by the leading BS.

In aspects of the present disclosure, if a non-leading BS succeeds with a CAT2 LBT during the CAT2 LBT occasion arranged by the leading BS, then that non-leading BS may occupy the channel (e.g., transmit a signal on the bandwidth), inform (e.g., over the back-haul or in a transmission via another carrier not in the bandwidth, when available) the leading gNB, and freeze a back-off counter of the non-leading BS.

According to aspects of the present disclosure, the leading BS may determine to execute a full reuse-one COT, based on the one or more conditions in the trigger.

In aspects of the present disclosure, the leading BS may report to the network (e.g., a network entity) that the leading BS has determined to execute a full reuse-one COT, in response to the trigger and the leading BS making the determination to execute the full reuse-on COT.

According to aspects of the present disclosure, the lead BS may alternatively determine to terminate the COT early. The leading BS may then inform other BSs in the cluster of the early termination of the COT, via a back-haul or another carrier not in the bandwidth, when available. The leading BS may then double its CW and redraw a random number to restart a CAT4 LBT.

In aspects of the present disclosure, any non-leading BS in the cluster may resume the CAT4 LBT, using the frozen back-off counter.

According to aspects of the present disclosure, BSs in a cluster may compete for the COT (i.e., start the CAT4 LBT) with different purposes, including:
1.) determining to schedule uplink (UL) traffic;
2.) determining to transmit downlink (DL) traffic;
3.) determining to both schedule UL traffic and transmit DL traffic; and
4.) No traffic, i.e., the BS is competing for the COT as a helping BS to other BSs.

In aspects of the present disclosure, the LBT trigger may specify, to the BSs in the cluster, a maximum number of occasions of being a leading BS. A BS that has reached the maximum number of occasions of being a leading BS may report this to the NW and stop further CAT4 LBT attempts. Such a BS may function as a non-leading BS.

Figure 4:
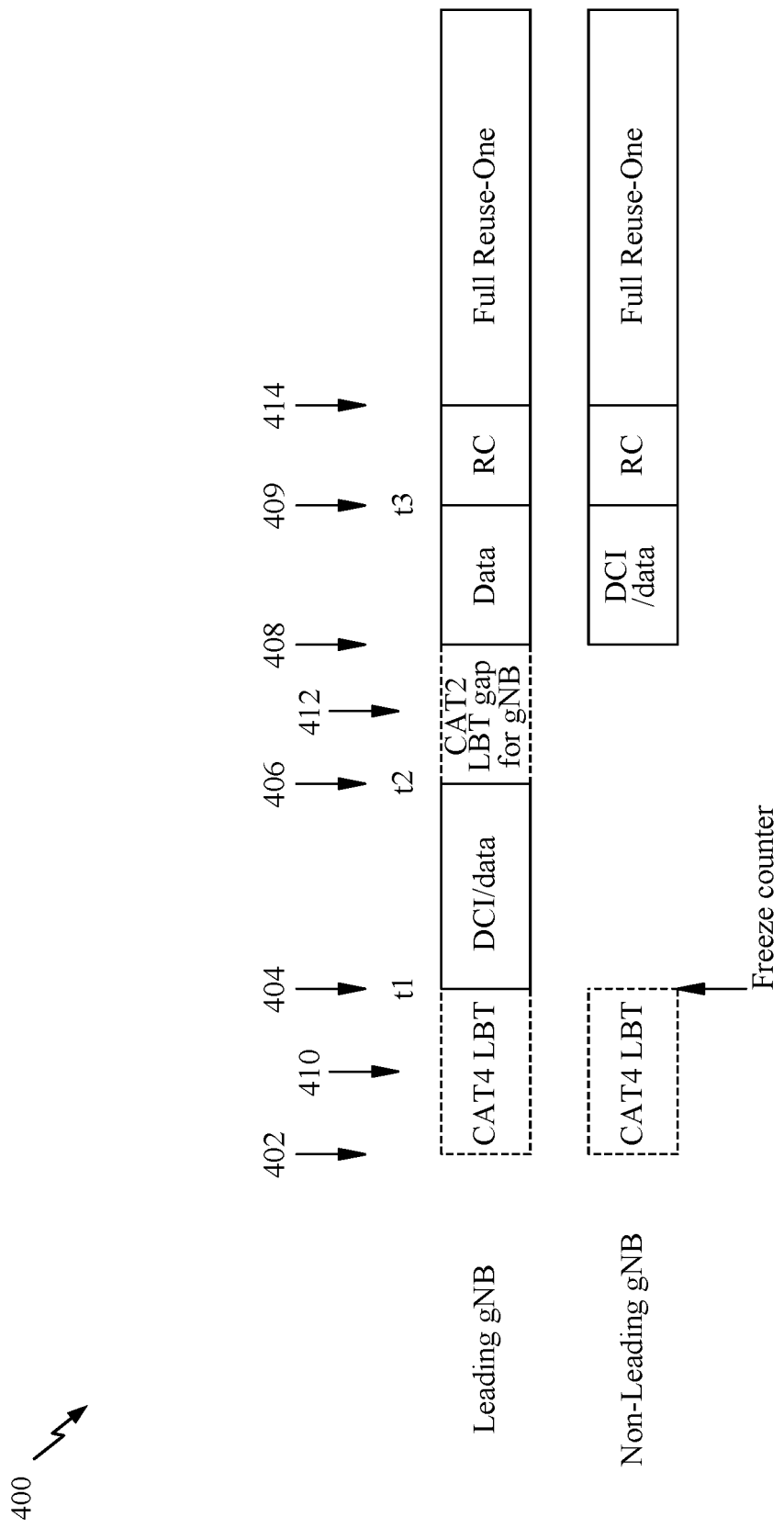
FIG. 4 is an exemplary transmission timeline 400 for a DL full reuse-one COT, according to aspects of the present disclosure.

FIG. 4 is an exemplary transmission timeline 400 for a DL full reuse-one COT, according to aspects of the present disclosure. In the exemplary transmission timeline, two or more BSs in a cluster obtain (e.g., via a backhaul) a DL-only LBT trigger at 402. The trigger specifies a length of a first period for transmission of downlink control information (DCI) and/or data by whichever BS wins the CAT4 LBT and becomes the leading BS for the channel occupancy time (COT). The first period starts after the CAT4 LBT 410 is completed at 404. As illustrated, non-leading BSs also freeze their back-off counters at 404. During the first period, the leading BS notifies the non-leading BSs of the CAT2 LBT, in addition to transmitting DCI or data. The trigger also specifies a length of a second period for the CAT2 LBT and transmission of DCI and/or data by the non-leading BSs. The second period starts at the end of the first period at 406. As illustrated, the leading BS does not transmit during the CAT2 LBT at 412. In the remainder of the second period after the CAT2 LBT at 408, the leading BS may transmit data and the non-leading BSs may transmit DCI and/or data. When the second period ends at 409, the BSs (leading and non-leading) perform a coordinated rate control (RC) occasion (CRCO) in order for each BS to determine a data transmission rate and signal strength to use in the full reuse-one period that starts after the CRCO at 414. The BSs then transmit additional data, according to their previously transmitted DCIs, for the remainder of the full reuse-one period. If the leading BS determines to terminate the full reuse-one COT early (i.e., as mentioned above), then the full reuse-one COT ends at 409, at which point the leading BS doubles the size of the contention window of the leading BS and the non-leading BSs unfreeze their back-off counters to perform a new CAT4 LBT.

Figure 5:
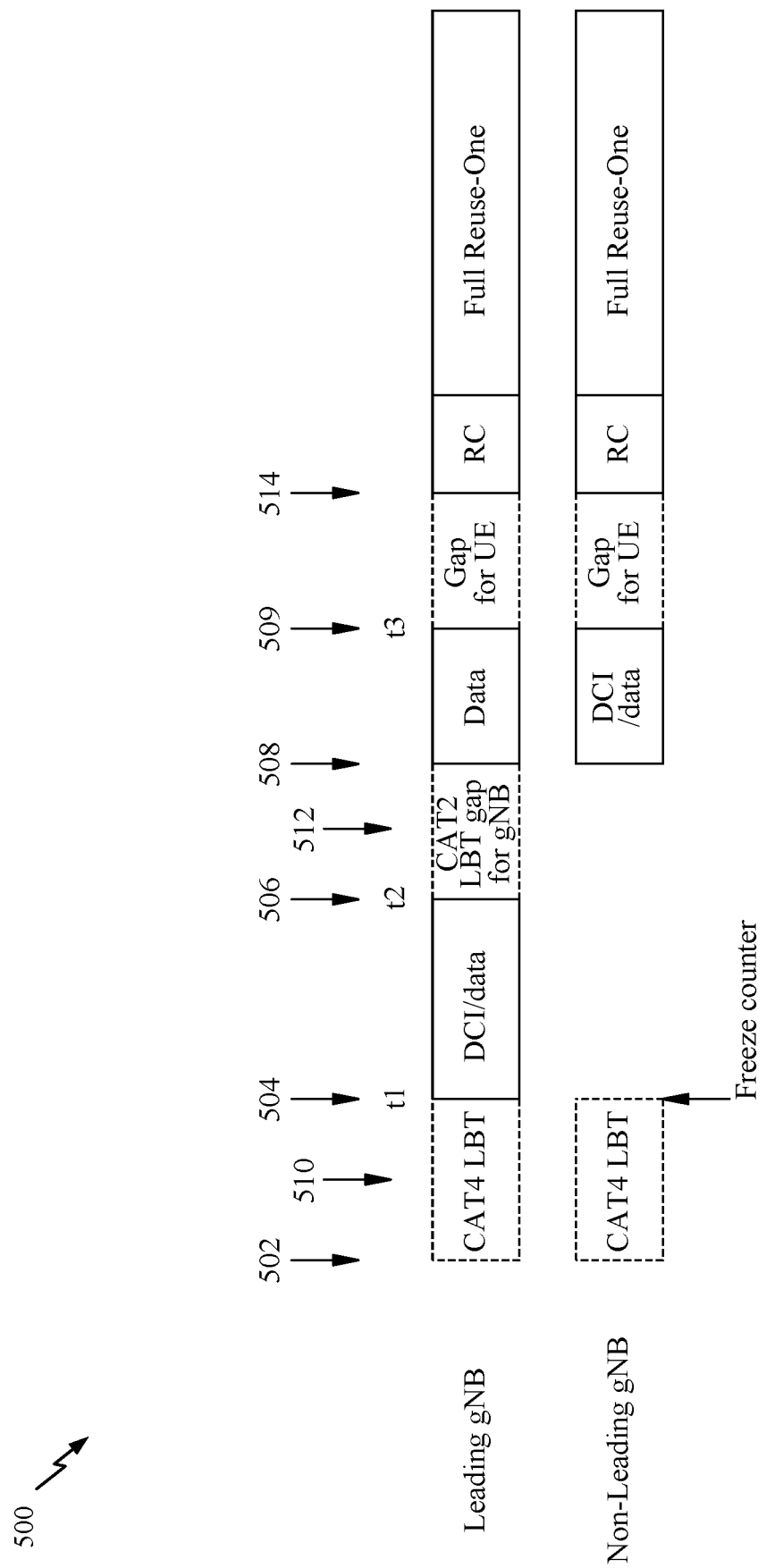
FIG. 5 is an exemplary transmission timeline 500 for an UL-involved (i.e., mixed DL and UL) full reuse-one COT, according to aspects of the present disclosure.

FIG. 5 is an exemplary transmission timeline 500 for an UL-involved (i.e., mixed DL and UL) full reuse-one COT, according to aspects of the present disclosure. In the exemplary transmission timeline, two or more BSs in a cluster obtain (e.g., via a backhaul) an UL-only LBT trigger at 502. As with the DL-only trigger described with reference to FIG. 4 above, the UL-only trigger in the exemplary transmission timeline specifies a length of a first period for transmission of DCI and/or data by the leading BS for the channel occupancy time (COT) and a length of a second period for a CAT2 LBT and transmission of DCI and/or data by the non-leading BSs. The UL-involved LBT trigger also specifies that another CAT2 LBT occasion is to be configured (e.g., by the leading BS) at 509 for UEs with scheduled UL grants. The first period starts after the CAT4 LBT 510 is completed at 504. As illustrated, non-leading BSs also freeze their back-off counters at 504. During the first period, the leading BS notifies the non-leading BSs of the CAT2 LBT at 506 and the CAT2 LBT occasion for UEs at 509, in addition to transmitting DCI or data. The second period starts at the end of the first period at 506. As illustrated, the leading BS does not transmit during the CAT2 LBT at 512. In the remainder of the second period after the CAT2 LBT at 508, the leading BS may transmit data and the non-leading BSs may transmit DCI and/or data. When the second period ends at 509, the BSs (leading and non-leading) refrain from transmitting and UEs with scheduled UL grants (e.g., transmitted in the DCIs from the leading BS and the non-leading BSs) perform a CAT2 LBT procedure. At 514, UEs that passed the CAT2 LBT and are configured to perform a CRCO and the BSs perform a CRCO in order for the UEs and BSs to determine a data transmission rate and signal strength to use in the full reuse-one period that starts after the CRCO at 514. UEs with scheduled UL grants (including UEs that did not perform a CRCO) and the BSs then transmit additional data, according to the previously transmitted DCIs, for the remainder of the full reuse-one period. If the leading BS determines to terminate the full reuse-one COT early (i.e., as mentioned above), then the full reuse-one COT ends at 509, at which point the leading BS doubles the size of the contention window of the leading BS and the non-leading BSs unfreeze their back-off counters to perform a new CAT4 LBT.

Figure 6:
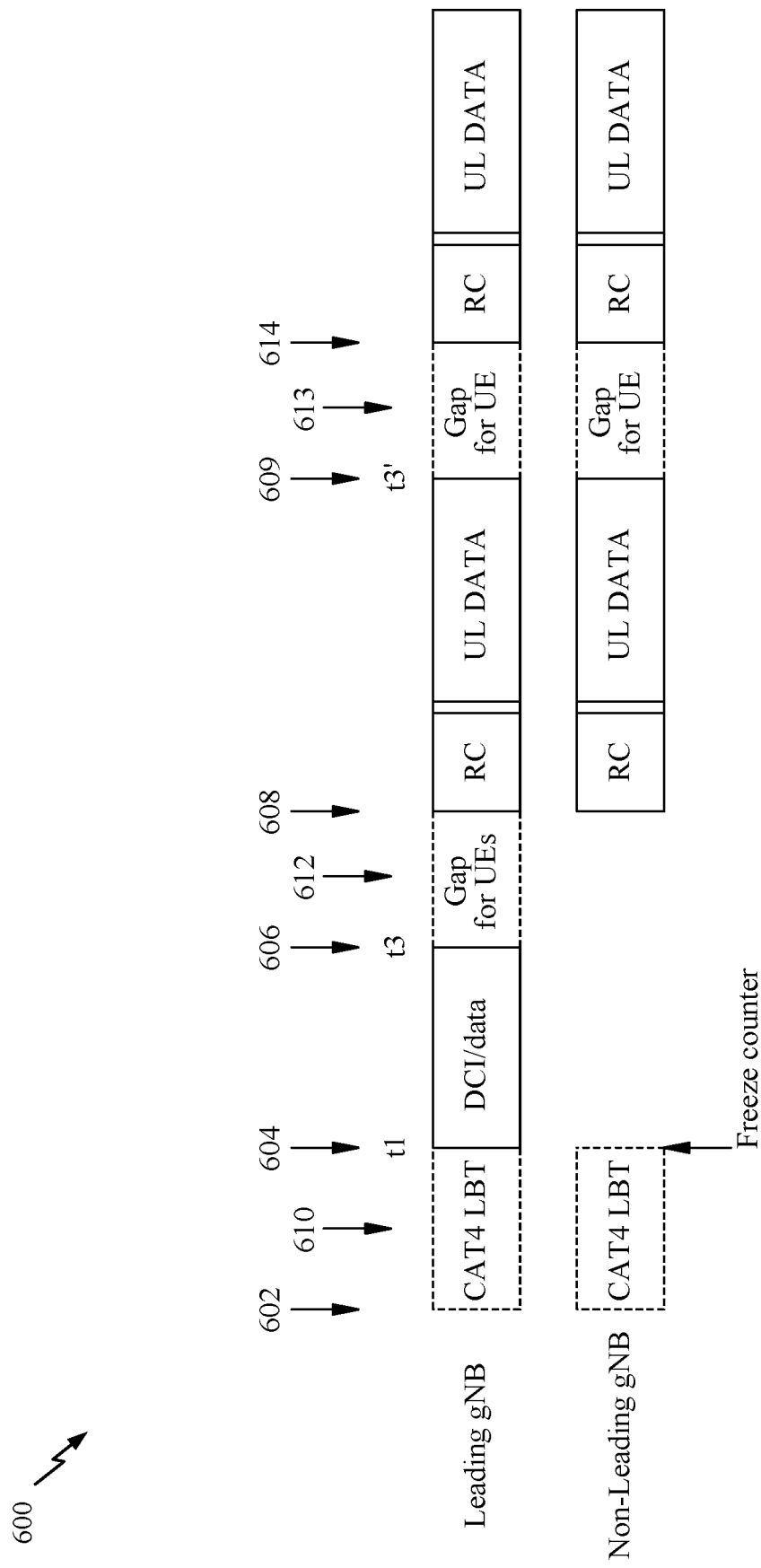
FIG. 6 is an exemplary transmission timeline 500 for an UL-only with cross-BS UL scheduling full reuse-one COT, according to aspects of the present disclosure.

FIG. 6 is an exemplary transmission timeline 500 for an UL-only with cross-BS UL scheduling full reuse-one COT, according to aspects of the present disclosure. For UL-only together with cross-gNB UL scheduling, the LBT trigger can directly specify a plurality of start times 606 and 609 for CAT2 LBTs for UEs. While two CAT2 LBTs are illustrated, the present disclosure is not so limited, and the trigger can specify more than two start times for CAT2 LBTs. As with the triggers described above with reference to FIGS. 4 & 5, the first period starts after the CAT4 LBT 610 is completed at 604. As illustrated, non-leading BSs also freeze their back-off counters at 604. During the first period, the leading BS notifies the non-leading BSs of the CAT2 LBTs at 606 and 609, in addition to transmitting DCI or data. When the first CAT2 LBT occasion starts 606, the BSs (leading and non-leading) refrain from transmitting and UEs with scheduled UL grants perform a CAT2 LBT procedure. At 608, UEs that passed the CAT2 LBT at 612 and are configured to perform a CRCO and the BSs perform a CRCO in order for the UEs and BSs to determine a data transmission rate and signal strength to use in the full reuse-one period that starts after the CRCO at 608. UEs with scheduled UL grants (including UEs that did not perform a CRCO) transmit UL data, until a next CAT2 LBT occasion starts at 609. The BSs (leading and non-leading) refrain from transmitting in the CAT2 LBT occasion at 613 and UEs with scheduled UL grants perform a CAT2 LBT procedure. At 614, UEs that passed the CAT2 LBT at 613 and are configured to perform a CRCO and the BSs perform another CRCO in order for the UEs and BSs to determine a data transmission rate and signal strength to use in the full reuse-one period that starts after the CRCO at 614. If the leading BS determines to terminate the full reuse-one COT early (i.e., as mentioned above), then the full reuse-one COT ends at 606, at which point the leading BS doubles the size of the contention window of the leading BS and the non-leading BSs unfreeze their back-off counters to perform a new CAT4 LBT.

According to aspects of the present disclosure, in the CAT2 LBT gap for gNB illustrated at 412 and 512 in FIGS. 4 & 5, the non-leading BSs may conduct an enhanced CAT2 LBT, including:

1.) Applying an offset on the ED threshold as compared to a default ED threshold, such as an ED threshold determined per an NR-U specification (e.g., using a −82 dBm threshold when −72 dBm is specified by an NR-U specification for 23 dBm TX power over a 20 MHz bandwidth);
2.) Using a longer energy measurement time than a default measurement time, such as a measurement time determined per an NR-U or Wi-Fi specification (e.g., using an 8 µs measurement time instead of a 4 µs measurement time, as specified in an NR-U specification for a 20 MHz bandwidth);
3.) Detecting for energy in the bandwidth during more ED measurement times per occasion than a default number of ED measurement times per occasion (e.g., 3 measurement times of 4 µs each instead of 2 measurements of 4 µs each, as specified in an NR-U specification for a 25 µs LBT gap);
4.) Detecting for a Wi-Fi short training field (STF) during the CAT2 LBT gap; and/or
5.) Performing a cyclostationary check for Wi-Fi transmissions during the CAT2 LBT gap.

In aspects of the present disclosure, a maximum channel occupancy time (MCOT) for a reuse-one COT in a bandwidth as described above may depend on a number of BSs to which the trigger for the reuse-one COT in the bandwidth is directed. According to aspects of the present disclosure, the more parallel links (i.e., links from one BS, of a cluster of BSs, to another node on the bandwidth) are defined for a full reuse-one COT, the longer the allowed MCOT for a same priority used in a CAT4 LBT.

Figure 7:
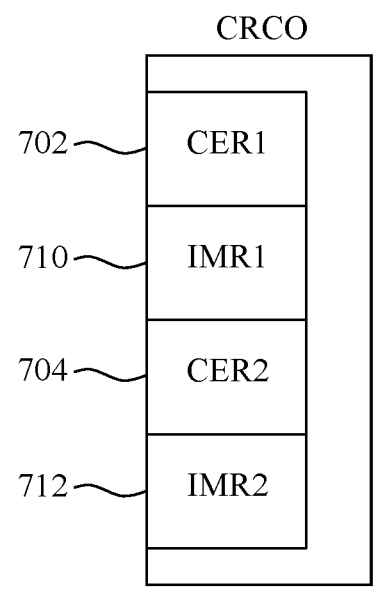
FIG. 7 illustrates an exemplary coordinated rate control occasion (CRCO) 700, according to aspects of the present disclosure.

FIG. 7 illustrates an exemplary coordinated rate control occasion (CRCO) 700, according to aspects of the present disclosure. In aspects of the present disclosure, any link, whether a DL link from a BS to a UE or an UL link from a UE to a BS, may be allocated a channel estimation resource (CER) 702 or 704 under the coordination of the network (i.e., a network entity). That is, a BS or a UE may be allocated a CER and the BS or UE may estimate the channel based on measurement of the CER when the BS or UE performs a CRCO. While the exemplary CRCO shows two CERs, the present disclosure is not so limited, and a CRCO may include more than two CERs. No other link (i.e., no BS or UE) is allowed to transmit on an allocated CER (e.g., a CER may be configured as a zero power channel state information reference signal (ZP-CSI-RS) for DL transmissions). In a CRCO for a DL reuse-one COT, a BS allocated a CER may send an aperiodic CSI-RS. The BS may receive a CSI report from a UE that measures the aperiodic channel state information (CSI) reference signal (CSI-RS). In a CRCO for an UL reuse-one COT, a UE allocated a CER may send an aperiodic sounding reference signal (SRS). A BS receiving the SRS may measure the SRS to estimate the channel and use the estimate in making UL grants to the UE. According to aspects of the present disclosure, any link, whether a DL link from a BS to a UE or an UL link from a UE to a BS, may be allocated an interference measurement resource (IMR) 710 or 712 under the coordination of the network (i.e., a network entity). That is, a BS or a UE may be allocated an IMR and the BS or UE may estimate interference on the channel based on a measurement of the IMR when the BS or UE performs a CRCO. While the exemplary CRCO shows two IMRs, the present disclosure is not so limited, and a CRCO may include more than two IMRs. Any other link (i.e., any other UE or BS) that transmits on an allocated IMR must use a proper transmit precoder (i.e., a transmit precoder assigned to the IMR). The UE or BS to which the IMR is allocated uses the precoder that the UE or BS determines based on the measurement of the IMR when that UE or BS is not doing rate control in this CRCO. The UE or BS to which the IMR is allocated uses a most likely transmit precoder (e.g., the transmit precoder in the most recent COT) when the UE or BS is doing rate control in this CRCO.

Figure 8:
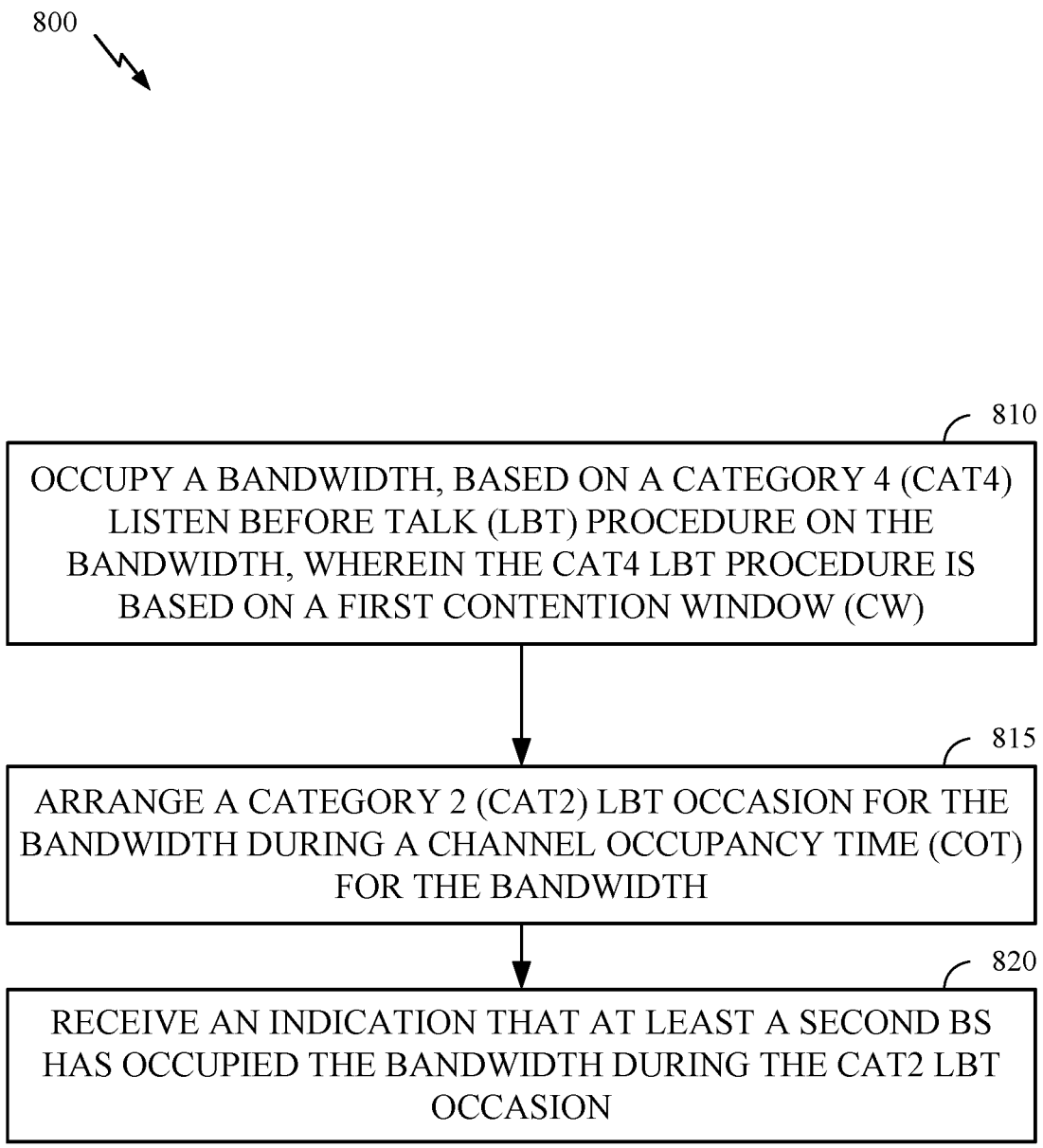
FIG. 8 is a flow diagram illustrating example operations for wireless communication by a leading BS, in accordance with certain aspects of the present disclosure.

FIG. 8 is a flow diagram illustrating example operations 800 for wireless communication, in accordance with certain aspects of the present disclosure. The operations 800 may be performed, for example, by a first BS (e.g., such as the BS 110a in the wireless communication network 100). Operations 800 may be implemented as software components that are executed and run on one or more processors (e.g., controller/processor 240 of FIG. 2). Further, the transmission and reception of signals by the first BS in operations 800 may be enabled, for example, by one or more antennas (e.g., antennas 234 of FIG. 2). In certain aspects, the transmission and/or reception of signals by the first BS may be implemented via a bus interface of one or more processors (e.g., controller/processor 240) obtaining and/or outputting signals.

At block 810, operations 800 begin with the first BS occupying a bandwidth, based on a category 4 (CAT4) listen before talk (LBT) procedure on the bandwidth, based on a first contention window (CW). For example, a first BS 110a (shown in FIG. 1) and a second BS (e.g., BS 110r, shown in FIG. 1) are arranged to cooperatively compete for a COT on a bandwidth under network coordination. In the example, a network entity (e.g., network controller 130, shown in FIG. 1), such as a central unit (CU), sends an LBT trigger to kick off independent, parallel CAT4 LBTs on the bandwidth by the first BS and the second BS, with independent random numbers for the CAT4 LBTs drawn by the respective BSs according to independent contention windows (CWs). The trigger may specify one or more conditions for a full reuse-one COT for the bandwidth, such as at least two parallel transmissions occurring in a period on the bandwidth. Still in the example, the first BS occupies the bandwidth, based on the LBT procedure performed by the first BS in the first CW (e.g., the first BS listens on the bandwidth, fails to detect a transmission, and begins transmitting on the bandwidth).

At block 815, operations 800 continue with the first BS arranging a category 2 (CAT2) LBT occasion for the bandwidth during a channel occupancy time (COT) for the bandwidth. Continuing the example from above, the first BS 110a arranges a CAT2 LBT occasion for the bandwidth occupied by the first BS in block 810 during a COT for the bandwidth.

Operations 800 continue at block 820 with the first BS receiving an indication that at least a second BS has occupied the bandwidth during the CAT2 LBT occasion. Continuing the example from above, the first BS 110a receives an indication that at least a second BS (e.g., BS 110r, shown in FIG. 1) has occupied the bandwidth of block 810 during the CAT 2 LBT occasion arranged by the first BS in block 815.

In aspects of the present disclosure, a BS performing operations 800 may obtain, from a network entity, a trigger to perform the CAT4 LBT procedure on the bandwidth, wherein the trigger indicates a condition for a full reuse-one COT for the bandwidth.

Any of the first BS or the second BS that first checks out a COT may occupy the channel and arrange a CAT2 LBT occasion for other BSs to join in. The BS that first checks out a COT may be referred to as the leading BS, and the other BS may be referred to as the non-leading BS. The non-leading BS may conduct a CAT2 LBT and, if the CAT2 LBT is successful, will occupy the channel and inform the leading BS to freeze a back-off counter of the leading BS, such as the example shown in 604 of FIG. 6.

According to aspects of the present disclosure, a BS performing operations 800 may obtain, from a network entity, a trigger to perform the CAT4 LBT procedure on the bandwidth, wherein the trigger indicates a condition for a full reuse-one COT for the bandwidth. The BS may determine, based on the condition, to execute a full reuse-one COT for the bandwidth; and report to a network entity that the BS has determined to execute the full reuse-one COT for the bandwidth.

In aspects of the present disclosure, a BS performing operations 800 may perform the CAT4 LBT, wherein performing the CAT4 LBT includes transmitting a signal on the bandwidth to occupy the bandwidth.

According to aspects of the present disclosure, arranging the CAT2 LBT occasion in block 815 may include notifying the second BS and zero or more other BSs of the COT and the CAT2 LBT occasion for the bandwidth and refraining from transmitting on the bandwidth during the CAT2 LBT occasion In aspects of the present disclosure, a BS performing operations 800 may notify the second BS and zero or more other BSs that the COT is terminating early; determine a second CW equal to double the first CW; and start another CAT4 LBT, based on the second CW.

According to aspects of the present disclosure, the trigger in block 805 may be for BSs that have downlink (DL) traffic to transmit, the first BS may have DL traffic to transmit, and the first BS may determine the first CW based on the first BS having the DL traffic.

In aspects of the present disclosure, the trigger from the network entity to perform the CAT4 LBT procedure on the bandwidth mentioned above may be for BSs that have determined to schedule uplink (UL) traffic during the COT on the bandwidth and the first BS may determine to schedule UL traffic during the COT on the bandwidth and may determine the first CW based on the determination to schedule the UL traffic on the bandwidth.

According to aspects of the present disclosure, the trigger from the network entity to perform the CAT4 LBT procedure on the bandwidth mentioned above may be for BSs that have downlink (DL) traffic to transmit or have determined to schedule uplink (UL) traffic during the COT on the bandwidth; the first BS may have DL traffic to transmit or may have determined to schedule UL traffic during the COT on the bandwidth; and the first BS may determine the first CW based on the first BS having the DL traffic or the determination to schedule the UL traffic during the COT on the bandwidth.

In aspects of the present disclosure, the trigger from the network entity to perform the CAT4 LBT procedure on the bandwidth mentioned above may indicate a maximum number of occasions that the first BS can be a lead BS for the full reuse-one COT, and a BS performing operations 800 may determine, prior to the CAT4 LBT, that the BS has been the lead BS for a number of other full reuse-one COTs that is less than the indicated maximum number.

According to aspects of the present disclosure, the trigger from the network entity to perform the CAT4 LBT procedure on the bandwidth mentioned above may be for BSs that have downlink (DL) traffic to transmit; the trigger may include a first indication of a length of a first period and a second indication of a length of a second period; the first period may begin at the end of the CAT4 LBT in block 810; the second period may start at the end of the first period; arranging the CAT2 LBT in block 820 may include indicating the CAT2 LBT starts at the end of the first period; and a BS performing operations 800 may transmit downlink control information (DCI) or data on the bandwidth during the first period. In aspects of the present disclosure, a BS performing operations 800 may perform a coordinated rate control (RC) occasion (CRCO) with the at least the second BS of block 835 at the end of the second period. According to aspects of the present disclosure, performing the CRCO by the BS may include transmitting an aperiodic channel state information (CSI) reference signal (CSI-RS) via a channel estimation resource (CER) within the bandwidth. In aspects of the present disclosure, a BS performing operations 800 may receive an allocation of the CER from the network entity. According to aspects of the present disclosure, performing the CRCO by the BS may include measuring interference on an interference measurement resource (IMR) within the bandwidth. In aspects of the present disclosure, a BS performing operations 800 may receive an allocation of the IMR from the network entity. According to the full reuse-one COT may begin at the end of the second period. In aspects of the present disclosure, a BS performing operations 800 may, subsequent to the end of the second period, notify the other BSs that the COT is terminating early; subsequent to the end of the second period, determine a second CW equal to double the first CW; and subsequent to the end of the second period, start another CAT4 LBT, based on the second CW.

According to aspects of the present disclosure, the trigger from the network entity to perform the CAT4 LBT procedure on the bandwidth mentioned above may be for BSs that have determined to schedule uplink (UL) traffic during the COT on the bandwidth; the trigger may include a first indication of a length of a first period and a second indication of a length of a second period; the first period may begin at the end of the CAT4 LBT; the second period may start at the end of the first period; arranging the CAT2 LBT (as in block 820) may include indicating the CAT2 LBT starts at the end of the first period; and a BS performing operations 800 may arrange another CAT2 LBT at the end of the second period for UEs; and transmit downlink control information (DCI) or data on the bandwidth during the first period. In aspects of the present disclosure, a BS performing operations 800 may perform a coordinated rate control (RC) occasion (CRCO) with the at least the second BS and zero or more UEs during a third period occurring after the end of the second period.

According to aspects of the present disclosure, the trigger from the network entity to perform the CAT4 LBT procedure on the bandwidth mentioned above may be for BSs that have determined to schedule uplink (UL) traffic during the COT on the bandwidth; the trigger may include a first indication of a length of a first period and one or more second indications of starting times of one or more second periods; the first period may begin at the end of the CAT4 LBT and end at a starting time of an earliest second period; none of the second periods may overlap the first period or any other second period; arranging the CAT2 LBT (as in block 820) may include indicating the CAT2 LBT starts at the beginning of the earliest second period and that the CAT2 LBT is for user equipments (UEs); and a BS performing operations 800 may arrange another CAT2 LBT in the bandwidth for UEs in each of the second periods after the earliest second period; and transmit downlink control information (DCI) or data on the bandwidth during the first period. In aspects of the present disclosure, a BS performing operations 800 may perform a coordinated rate control (RC) occasion (CRCO) with the at least the second BS and zero or more UEs during each of the second periods.

In aspects of the present disclosure, the trigger from the network entity to perform the CAT4 LBT procedure on the bandwidth mentioned above may indicate a number of BSs to which the trigger is directed, and a BS performing operations 800 may determine, based on the number, a maximum channel occupancy time (MCOT) for the bandwidth; and determine the full reuse-one COT, based on the MCOT.

According to aspects of the present disclosure, a BS performing operations 800 may transmit a sequence on the bandwidth during the CAT2 LBT. The sequence may indicate to other BSs that the BS is a leading BS for a full reuse-one COT for the bandwidth.

Figure 9:
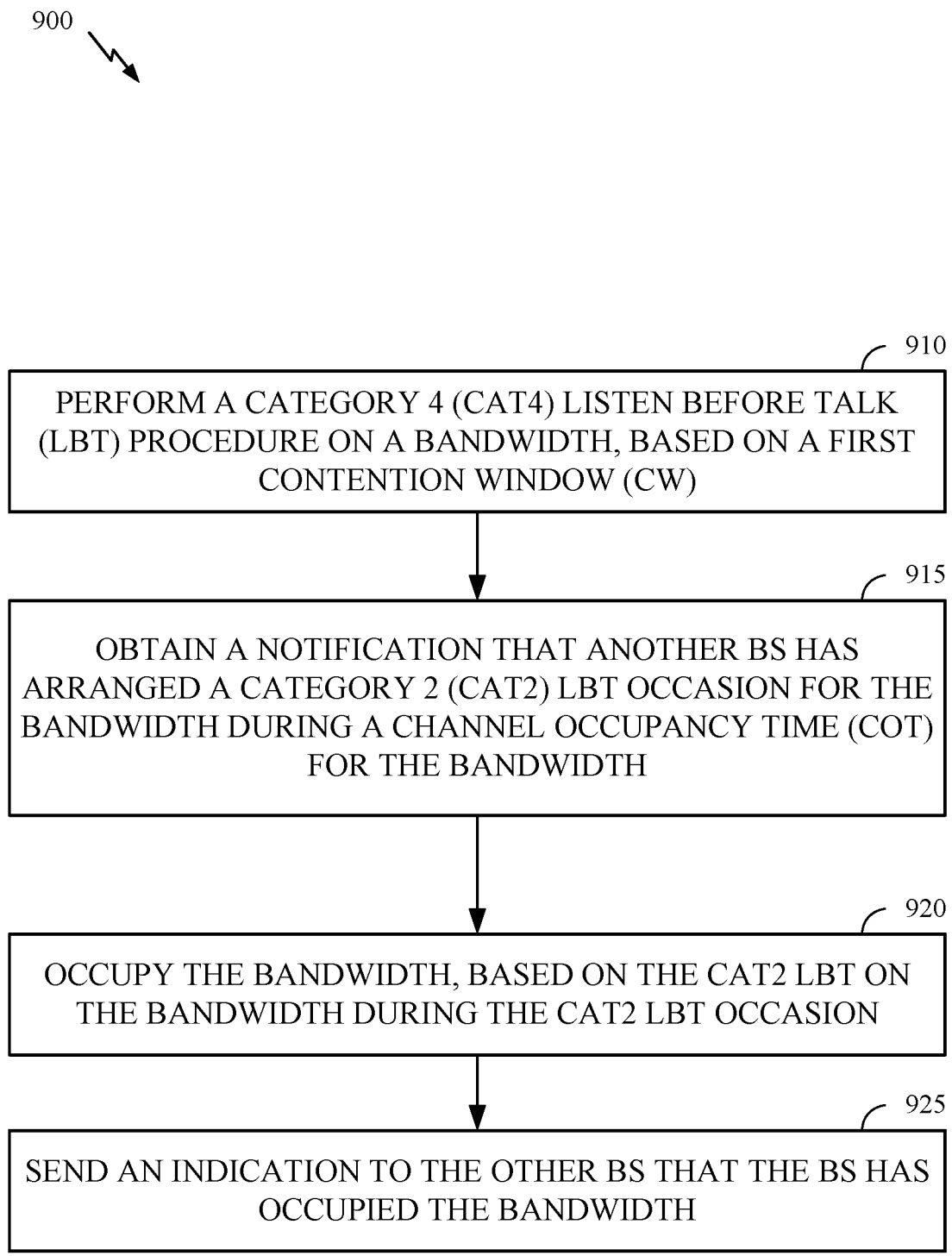
FIG. 9 is a flow diagram illustrating example operations for wireless communication by a non-leading BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as BS 110b in the wireless communication network 100). The operations 900 may be complimentary operations by the BS to the operations 800 performed by the BS. Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

At block 910, operations 900 begin with the BS performing a category 4 (CAT4) listen before talk (LBT) procedure on a bandwidth, based on a first contention window (CW). For example, a BS 110r (shown in FIG. 1) and another BS (e.g., BS 110a, shown in FIG. 1) are arranged to cooperatively compete for a COT on a bandwidth under network coordination. In the example, a network entity (e.g., network controller 130, shown in FIG. 1), such as a central unit (CU), sends an LBT trigger to kick off independent, parallel CAT4 LBTs on the bandwidth by the BS and the other BS, with independent random numbers for the CAT4 LBTs drawn by the respective BSs according to independent contention windows (CWs). The trigger may specify one or more conditions for a full reuse-one COT for the bandwidth, such as at least two parallel transmissions occurring in a period on the bandwidth. Still in the example, the BS 110r performs a CAT4 LBTs on the bandwidth, based on a first CW (e.g., a first CW of the BS).

Operations 900 continue at block 915 with the BS obtaining a notification that another BS has arranged a category 2 (CAT2) LBT occasion for the bandwidth during a channel occupancy time (COT) for the bandwidth. Continuing the example, the BS 110r obtains a notification (e.g., via a backhaul network) that the other BS 110a has arranged a category 2 (CAT2) LBT occasion for the bandwidth (i.e., the bandwidth on which the BS performed the CAT4 LBT of block 910) during a channel occupancy time (COT, e.g., a COT of the other BS 110*a*) for the bandwidth.

Operations 900 continue at block 920 with the BS occupying the bandwidth based on the CAT2 LBT on the bandwidth during the CAT2 LBT occasion. Continuing the example from above, the BS 110*r* occupies the bandwidth based on the CAT2 LBT (i.e., the CAT2 LBT of block 915 is successful) on the bandwidth during the CAT2 LBT occasion of block 915 arranged by the other BS 110*a*.

Operations 900 continue at block 925 with the BS sending an indication to the other BS that the BS has occupied the bandwidth. Continuing the example from above, the BS 110*r* sends (e.g., via a backhaul) an indication to the other BS 110*a* that the BS has occupied the bandwidth.

According to aspects of the present disclosure, a BS performing operations 900 may obtain, from a network entity, a trigger (e.g., the LBT trigger described with reference to block 910 of FIG. 9) to perform the CAT4 LBT procedure on the bandwidth, wherein the trigger indicates a condition for a full reuse-one COT for the bandwidth.

In aspects of the present disclosure, performing the CAT4 LBT procedure of block 910 may include determining that another node occupies the bandwidth.

According to aspects of the present disclosure, a BS performing operations 900 may perform the CAT2 LBT of block 915, wherein performing the CAT2 LBT includes transmitting a signal on the bandwidth to occupy the bandwidth. The BS may receive, from the other BS, an indication that the BS and the other BS are to execute a full reuse-one COT for the bandwidth; and transmit downlink control information (DCI) or data on the bandwidth during the full reuse-one COT and subsequent to transmitting the signal on the bandwidth.

In aspects of the present disclosure, a BS performing operations 900 may freeze a backoff counter for the first CW subsequent to the CAT4 LBT; obtain a notification that the COT is terminating early; and start another CAT4 LBT, based on the frozen backoff counter.

According to aspects of the present disclosure, the trigger to perform the CAT4 LBT procedure on the bandwidth mentioned above may be for BSs that have downlink (DL) traffic to transmit, the BS may have DL traffic to transmit, and a BS performing operations 900 may determine the first CW based on the BS having the DL traffic.

In aspects of the present disclosure, the trigger to perform the CAT4 LBT procedure on the bandwidth mentioned above may be for BSs that have determined to schedule uplink (UL) traffic during the COT on the bandwidth and a BS performing operations 900 may determine the first CW based on the determination to schedule the UL traffic during the COT on the bandwidth.

According to aspects of the present disclosure, the trigger to perform the CAT4 LBT procedure on the bandwidth mentioned above may be for BSs that have downlink (DL) traffic to transmit or have determined to schedule uplink (UL) traffic during the COT on the bandwidth; the BS performing operations 900 may have DL traffic to transmit or may have determined to schedule UL traffic during the COT on the bandwidth; and the BS may determine the first CW based on the BS having the DL traffic or the determination to schedule the UL traffic during the COT on the bandwidth.

In aspects of the present disclosure, the trigger to perform the CAT4 LBT procedure on the bandwidth mentioned above may include an indication of a maximum number of occasions that the BS can be a lead BS for the full reuse-one COT, and the BS performing operations 900 may determine, prior to the CAT4 LBT, that the BS has been the lead BS for a number of full reuse-one COTs less than the maximum number.

According to aspects of the present disclosure, the trigger to perform the CAT4 LBT procedure on the bandwidth mentioned above may be for BSs that have downlink (DL) traffic to transmit; the trigger may include a first indication of a length of a first period and a second indication of a length of a second period; the first period may begin at the end of the CAT4 LBT; the second period may start at the end of the first period; the notification that the other BS has arranged the CAT2 LBT may indicate the CAT2 LBT starts at the end of the first period; and the BS performing operations 900 may transmit downlink control information (DCI) or data on the bandwidth during the second period, subsequent to the CAT2 LBT. In aspects of the present disclosure, the BS may perform a coordinated rate control (RC) occasion (CRCO) with the at least the other BS at the end of the second period. According to aspects of the present disclosure, performing the CRCO may include transmitting an aperiodic channel state information (CSI) reference signal (CSI-RS) via a channel estimation resource (CER) within the bandwidth. In aspects of the present disclosure, the BS may receive an allocation of the CER from the network entity. In aspects of the present disclosure, performing the CRCO may include measuring interference on an interference measurement resource (IMR) within the bandwidth. According to aspects of the present disclosure, the BS may receive an allocation of the IMR from the network entity. In aspects of the present disclosure, the full reuse-one COT may begin at the end of the second period. In aspects of the present disclosure, the BS may freeze a backoff counter for the first CW subsequent to transmitting the signal; receive, at the end of the second period, a notification from the other BS that the COT is terminating early; and, subsequent to the end of the second period, start another CAT4 LBT, based on the frozen backoff counter.

According to aspects of the present disclosure, the trigger to perform the CAT4 LBT procedure on the bandwidth mentioned above may be for BSs that have determined to schedule uplink (UL) traffic during the COT on the bandwidth; the trigger may include a first indication of a length of a first period and a second indication of a length of a second period; the first period may begin at the end of the CAT4 LBT of block 810; the second period may start at the end of the first period; the notification that the other BS has arranged the CAT2 LBT may indicate: the CAT2 LBT starts at the end of the first period; and the other BS has arranged another CAT2 LBT at the end of the second period for UEs; and the BS may transmit downlink control information (DCI) or data on the bandwidth during the second period. In aspects of the present disclosure, the BS may perform a coordinated rate control (RC) occasion (CRCO) with the other BS and zero or more UEs during a third period occurring after the end of the second period.

According to aspects of the present disclosure, the trigger to perform the CAT4 LBT procedure on the bandwidth mentioned above may be for BSs that have obtained an indication that a user equipment (UE) has uplink (UL) traffic to transmit to the BSs; the trigger may include a first indication of a length of a first period and one or more second indications of starting times of one or more second periods; the first period may begin at the end of the CAT4 LBT and end at a starting time of an earliest second period; none of the second periods may overlap the first period or any other second period; the notification that the other BS has arranged the CAT2 LBT of block 920 may indicate: the CAT2 LBT starts at the beginning of the earliest second period and is for user equipments (UEs); and the other BS has arranged another CAT2 LBT for UEs in each of the second periods after the earliest second period; and the BS may arrange another CAT2 LBT in the bandwidth for UEs in each of the second periods after the earliest second period; and transmit downlink control information (DCI) or data on the bandwidth during one or more of the second periods. In aspects of the present disclosure, the BS may perform a coordinated rate control (RC) occasion (CRCO) with the at least the first BS and zero or more UEs during each of the second periods.

According to aspects of the present disclosure, performing the CAT2 LBT mentioned above may include using an energy detection (ED) threshold different from a default threshold for the CAT2 LBT.

In aspects of the present disclosure, performing the CAT2 LBT mentioned above may include measuring energy in the bandwidth for a time longer than a default time for the CAT2 LBT.

According to aspects of the present disclosure, performing the CAT2 LBT mentioned above may include measuring energy in the bandwidth in more occasions that a default number of occasions for the CAT2 LBT.

In aspects of the present disclosure, performing the CAT2 LBT mentioned above may include detecting for a Wi-Fi short training field (STF).

According to aspects of the present disclosure, performing the CAT2 LBT mentioned above may include performing a cyclostationary check for Wi-Fi transmissions.

In aspects of the present disclosure, the trigger to perform the CAT4 LBT procedure on the bandwidth mentioned above may indicate a number of BSs to which the trigger is directed, and the BS may determine, based on the number, a maximum channel occupancy time (MCOT) for the bandwidth; and determine the full reuse-one COT based on the MCOT.

According to aspects of the present disclosure, performing the CAT2 LBT mentioned above may include receiving a sequence transmitted by the other BS on the bandwidth during the CAT2 LBT occasion and detecting for transmissions on resources orthogonal to the sequence during the CAT2 LBT occasion.

Figure 10:
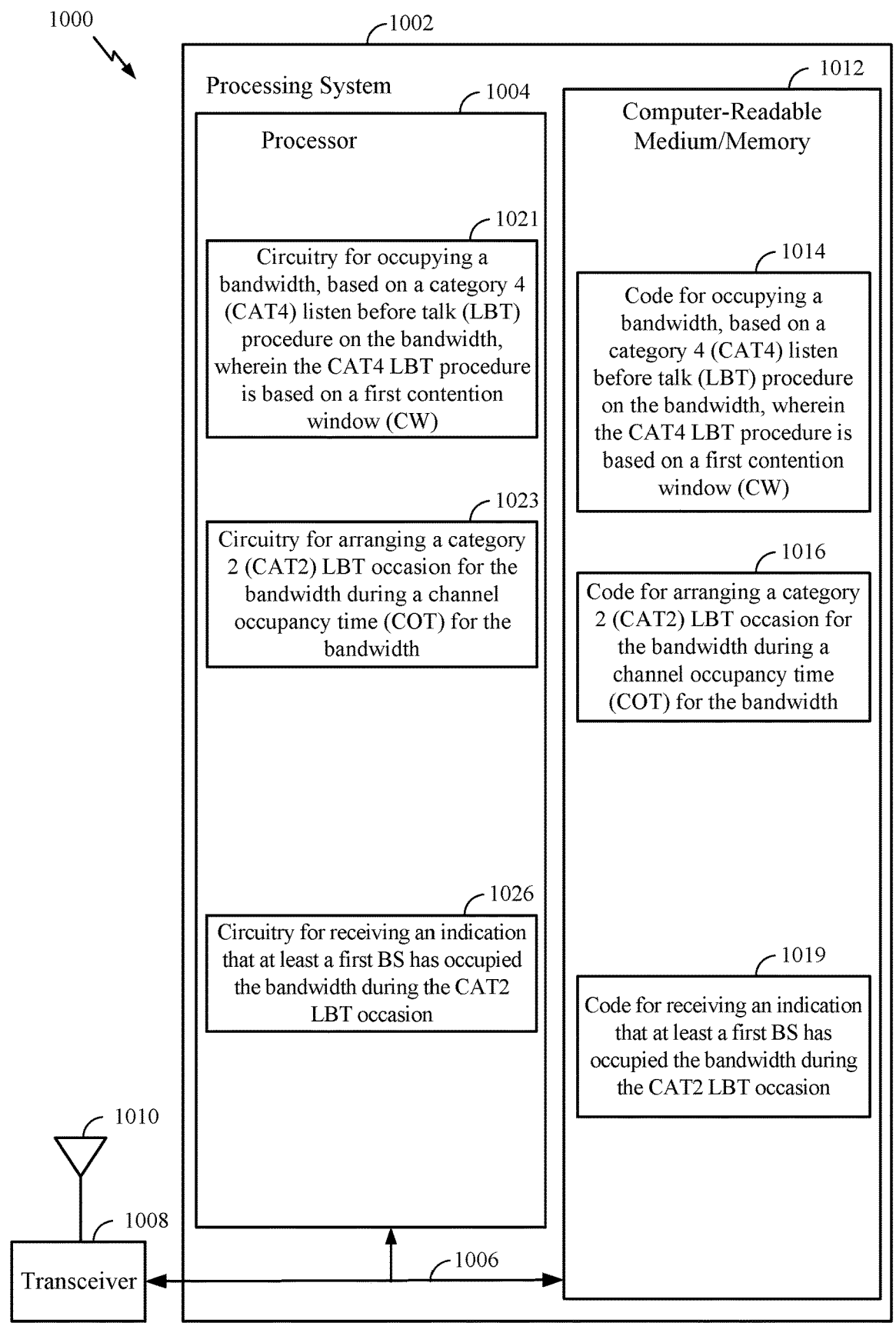
FIG. 10 illustrates a communications device that may include various components configured to perform the operations illustrated in FIG. 8.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for new radio (NR) devices in a reuse-one architecture on unlicensed spectrum. In certain aspects, computer-readable medium/memory 1012 stores code 1014 for occupying a bandwidth, based on a category 4 (CAT4) listen before talk (LBT) procedure on the bandwidth, wherein the CAT4 LBT procedure is based on a first contention window (CW); code 1016 for arranging a category 2 (CAT2) LBT occasion for the bandwidth during a channel occupancy time (COT) for the bandwidth; and code 1019 for receiving an indication that at least a first BS has occupied the bandwidth during the CAT2 LBT occasion. In certain aspects, the processor 1004 has circuitry configured to implement the code stored in the computer-readable medium/memory 1012. The processor 1004 includes circuitry 1021 for occupying a bandwidth, based on a category 4 (CAT4) listen before talk (LBT) procedure on the bandwidth, wherein the CAT4 LBT is based on a first contention window (CW); circuitry 1023 for arranging a category 2 (CAT2) LBT occasion for the bandwidth during a channel occupancy time (COT) for the bandwidth; and circuitry 1026 for receiving an indication that at least a first BS has occupied the bandwidth during the CAT2 LBT occasion.

Figure 11:
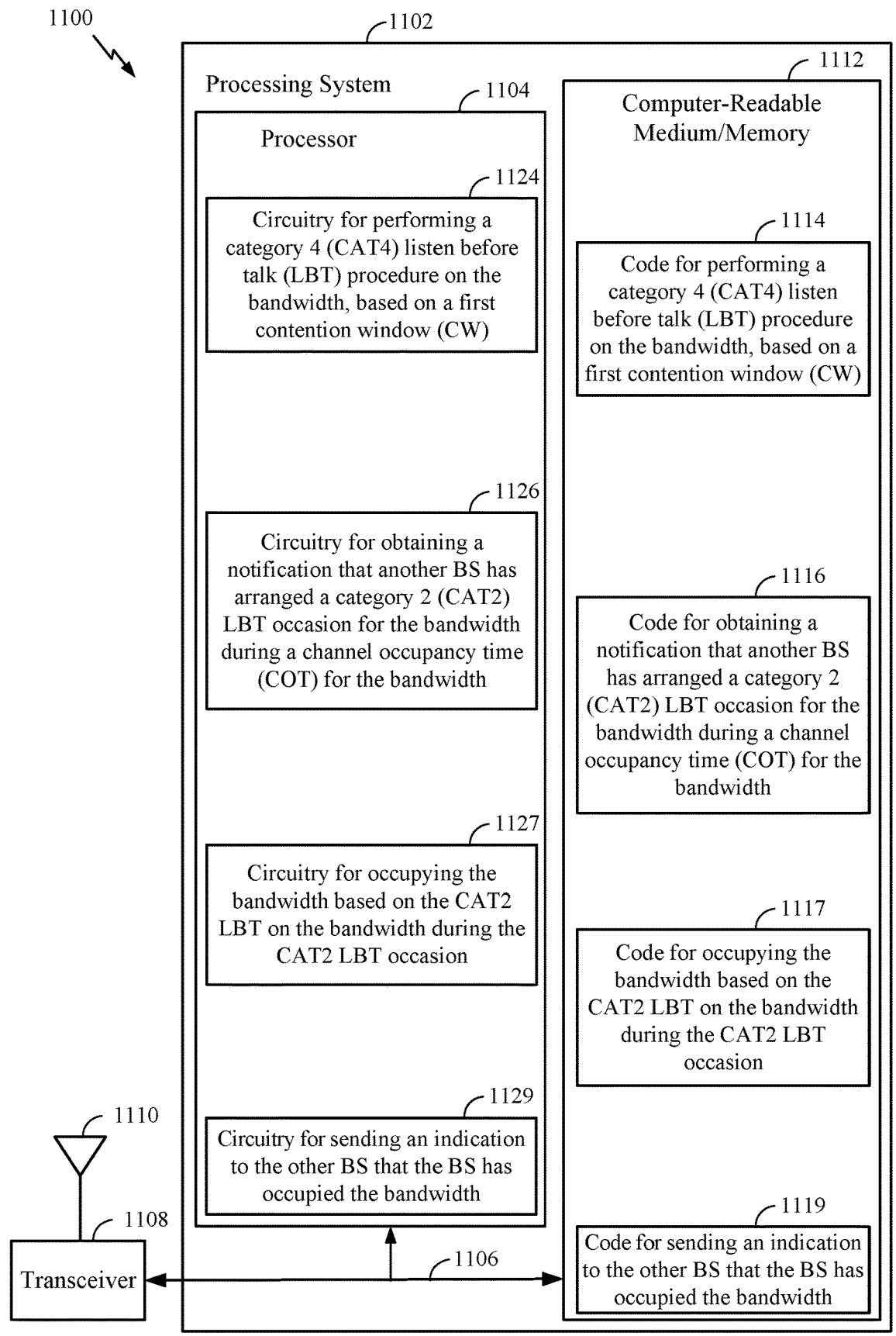
FIG. 11 illustrates a communications device that may include various components configured to perform the operations illustrated in FIG. 9.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for new radio (NR) devices in a reuse-one architecture on unlicensed spectrum. In certain aspects, computer-readable medium/memory 1112 stores code 1114 for performing a category 4 (CAT4) listen before talk (LBT) procedure on the bandwidth, based on a first contention window (CW); code 1116 for obtaining a notification that another BS has arranged a category 2 (CAT2) LBT occasion for the bandwidth during a channel occupancy time (COT) for the bandwidth; code 1117 for occupying the bandwidth based on the CAT2 LBT on the bandwidth during the CAT2 LBT occasion; and code 1119 for sending an indication to the other BS that the BS has occupied the bandwidth. In certain aspects, the processor 1104 has circuitry configured to implement the code stored in the computer-readable medium/memory 1112. The processor 1104 includes circuitry 1124 for performing a category 4 (CAT4) listen before talk (LBT) procedure on the bandwidth, based on a first contention window (CW); circuitry 1126 for obtaining a notification that another BS has arranged a category 2 (CAT2) LBT occasion for the bandwidth during a channel occupancy time (COT) for the bandwidth; circuitry 1127 for occupying the bandwidth based on the CAT2 LBT on the bandwidth during the CAT2 LBT occasion; and circuitry 1129 for sending an indication to the other BS that the BS has occupied the bandwidth.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, vehicle-to-everything (V2X) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8, and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first base station (BS), comprising:
  occupying a bandwidth, based on a category 4 (CAT4) listen before talk (LBT) procedure on the bandwidth, wherein the CAT4 LBT procedure is based on a first contention window (CW);
  arranging a category 2 (CAT2) LBT occasion for the bandwidth during a channel occupancy time (COT) for the bandwidth; and
  receiving an indication that at least a second BS has occupied the bandwidth during the CAT2 LBT occasion.

2. The method of claim 1, further comprising:
  obtaining, from a network entity, a trigger to perform the CAT4 LBT procedure on the bandwidth, wherein the trigger indicates a condition for a full reuse-one COT for the bandwidth.

3. The method of claim 2, further comprising:
  determining, based on the condition, to execute the full reuse-one COT for the bandwidth; and
  reporting to the network entity that the first BS has determined to execute the full reuse-one COT for the bandwidth.

4. The method of claim 2, wherein the trigger is for BSs that have downlink (DL) traffic to transmit, the first BS has DL traffic to transmit, and the method further comprises:
  determining the first CW based on the first BS having the DL traffic to transmit.

5. The method of claim 2, wherein the trigger is for BSs that have determined to schedule uplink (UL) traffic during the COT on the bandwidth, the first BS has determined to schedule UL traffic during the COT on the bandwidth, and the method further comprises:
  determining to schedule UL traffic during the COT on the bandwidth; and determining the first CW based on the determination to schedule the UL traffic on the bandwidth.

6. The method of claim 2, wherein:
the trigger is for BSs that have downlink (DL) traffic to transmit or have determined to schedule uplink (UL) traffic during the COT on the bandwidth;
the first BS has DL traffic to transmit or has determined to schedule UL traffic during the COT on the bandwidth; and the method further comprises:
determining the first CW based on the first BS having the DL traffic or the determination to schedule the UL traffic during the COT on the bandwidth.

7. The method of claim 2, wherein:
the trigger is for BSs that have downlink (DL) traffic to transmit;
the trigger comprises a first indication of a length of a first period and a second indication of a length of a second period;
the first period begins at the end of the CAT4 LBT;
the second period starts at the end of the first period;
arranging the CAT2 LBT comprises indicating the CAT2 LBT starts at the end of the first period; and
the method further comprises:
transmitting downlink control information (DCI) or data on the bandwidth during the first period.

8. The method of claim 2, wherein:
the trigger is for BSs that have determined to schedule uplink (UL) traffic during the COT on the bandwidth;
the trigger comprises a first indication of a length of a first period and a second indication of a length of a second period;
the first period begins at the end of the CAT4 LBT;
the second period starts at the end of the first period;
arranging the CAT2 LBT comprises indicating the CAT2 LBT starts at the end of the first period; and
the method further comprises:
arranging another CAT2 LBT at the end of the second period for UEs; and
transmitting downlink control information (DCI) or data on the bandwidth during the first period.

9. The method of claim 2, wherein:
the trigger is for BSs that have that have determined to schedule uplink (UL) traffic during the COT on the bandwidth;
the trigger comprises a first indication of a length of a first period and one or more second indications of starting times of one or more second periods;
the first period begins at the end of the CAT4 LBT and ends at a starting time of an earliest second period;
none of the second periods overlaps the first period or any other second period;
arranging the CAT2 LBT comprises indicating the CAT2 LBT starts at the beginning of the earliest second period and that the CAT2 LBT is for user equipments (UEs); and
the method further comprises:
arranging another CAT2 LBT in the bandwidth for UEs in each of the second periods after the earliest second period; and
transmitting downlink control information (DCI) or data on the bandwidth during the first period.

10. The method of claim 9, further comprising:
performing a coordinated rate control (RC) occasion (CRCO) with the at least the second BS and zero or more UEs during each of the second periods.

11. The method of claim 1, further comprising:
performing the CAT4 LBT, wherein performing the CAT4 LBT comprises transmitting a signal on the bandwidth to occupy the bandwidth.

12. The method of claim 1, wherein arranging the CAT2 LBT occasion comprises:
notifying the second BS and zero or more other BSs of the COT and the CAT2 LBT occasion for the bandwidth; and
refraining from transmitting on the bandwidth during the CAT2 LBT occasion.

13. The method of claim 1, further comprising:
notifying the second BS and zero or more other BSs that the COT is terminating early;
determining a second CW equal to double the first CW; and
starting another CAT4 LBT, based on the second CW.

14. The method of claim 1, further comprising:
transmitting a sequence on the bandwidth during the CAT2 LBT occasion.

15. A method for wireless communication by a base station (BS), comprising:
performing a category 4 (CAT4) listen before talk (LBT) procedure on a bandwidth, based on a first contention window (CW);
obtaining a notification that another BS has arranged a category 2 (CAT2) LBT occasion for the bandwidth during a channel occupancy time (COT) for the bandwidth;
occupying the bandwidth, based on the CAT2 LBT on the bandwidth during the CAT2 LBT occasion; and
sending an indication to the other BS that the BS has occupied the bandwidth.

16. The method of claim 15, further comprising:
freezing a backoff counter for the first CW subsequent to the CAT4 LBT;
obtaining a notification that the COT is terminating early; and
starting another CAT4 LBT, based on the frozen backoff counter.

17. The method of claim 15, wherein performing the CAT4 LBT procedure comprises determining that another node occupies the bandwidth.

18. The method of claim 15, further comprising:
obtaining, from a network entity, a trigger to perform the CAT4 LBT procedure on the bandwidth, wherein the trigger indicates a condition for a full reuse-one COT for the bandwidth.

19. The method of claim 18, wherein the trigger indicates a number of BSs to which the trigger is directed, and the method further comprises:
determining, based on the number, a maximum channel occupancy time (MCOT) for the bandwidth; and
determining the full reuse-one COT, based on the MCOT.

20. The method of claim 18, wherein the trigger is for BSs that have downlink (DL) traffic to transmit, the BS has DL traffic to transmit, and the method further comprises:
determining the first CW based on the BS having the DL traffic.

21. The method of claim 18, wherein the trigger is for BSs that have determined to schedule uplink (UL) traffic during the COT on the bandwidth, the BS has determined to schedule UL traffic, and the method further comprises:
determining the first CW based on the determination to schedule the UL traffic during the COT on the bandwidth.

22. The method of claim 18, wherein:
the trigger is for BSs that have downlink (DL) traffic to transmit or have determined to schedule uplink (UL) traffic during the COT on the bandwidth;
the BS has DL traffic to transmit or has determined to schedule UL traffic during the COT on the bandwidth; and the method further comprises:
determining the first CW based on the BS having the DL traffic or the determination to schedule the UL traffic during the COT on the bandwidth.

23. The method of claim 18, wherein:
the trigger is for BSs that have downlink (DL) traffic to transmit;
the trigger comprises a first indication of a length of a first period and a second indication of a length of a second period;
the first period begins at the end of the CAT4 LBT;
the second period starts at the end of the first period;
the notification that the other BS has arranged the CAT2 LBT indicates the CAT2 LBT starts at the end of the first period; and
the method further comprises:
transmitting downlink control information (DCI) or data on the bandwidth during the second period, subsequent to the CAT2 LBT.

24. The method of claim 23, wherein the full reuse-one COT begins at the end of the second period.

25. The method of claim 23, further comprising:
freezing a backoff counter for the first CW subsequent to the CAT4 LBT; receiving, at the end of the second period, a notification from the other BS that the COT is terminating early; and
subsequent to the end of the second period, starting another CAT4 LBT, based on the frozen backoff counter.

26. The method of claim 18, wherein:
the trigger is for BSs that have determined to schedule uplink (UL) traffic during the COT on the bandwidth;
the trigger comprises a first indication of a length of a first period and a second indication of a length of a second period;
the first period begins at the end of the CAT4 LBT;
the second period starts at the end of the first period;
the notification that the other BS has arranged the CAT2 LBT indicates:
the CAT2 LBT starts at the end of the first period; and
the other BS has arranged another CAT2 LBT at the end of the second period for UEs; and
the method further comprises:
transmitting downlink control information (DCI) or data on the bandwidth during the second period.

27. The method of claim 18, wherein:
the trigger is for BSs that have obtained an indication that a user equipment (UE) has uplink (UL) traffic to transmit to the BSs;
the trigger comprises a first indication of a length of a first period and one or more second indications of starting times of one or more second periods;
the first period begins at the end of the CAT4 LBT and ends at a starting time of an earliest second period;
none of the second periods overlaps the first period or any other second period;
the notification that the other BS has arranged the CAT2 LBT indicates:
the CAT2 LBT starts at the beginning of the earliest second period and is for user equipments (UEs); and
the other BS has arranged another CAT2 LBT for UEs in each of the second periods after the earliest second period; and
the method further comprises:
arranging another CAT2 LBT in the bandwidth for UEs in each of the second periods after the earliest second period; and
transmitting downlink control information (DCI) or data on the bandwidth during one or more of the second periods.

28. The method of claim 15, further comprising:
performing the CAT2 LBT, wherein performing the CAT2 LBT comprises transmitting a signal on the bandwidth to occupy the bandwidth.

29. An apparatus for wireless communications, comprising:
a memory; and
a processor coupled with the memory, the memory and the processor configured to:
occupy a bandwidth, based on a category 4 (CAT4) listen before talk (LBT) procedure on the bandwidth, wherein the CAT4 LBT procedure is based on a first contention window (CW);
arrange a category 2 (CAT2) LBT occasion for the bandwidth during a channel occupancy time (COT) for the bandwidth; and
receive an indication that at least a base station (BS) has occupied the bandwidth during the CAT2 LBT occasion.

30. A base station (BS), comprising:
a memory; and
a processor coupled with the memory, the memory and the processor configured to:
perform a category 4 (CAT4) listen before talk (LBT) procedure on a bandwidth, based on a first contention window (CW);
obtain a notification that another BS has arranged a category 2 (CAT2) LBT occasion for the bandwidth during a channel occupancy time (COT) for the bandwidth;
occupy the bandwidth, based on the CAT2 LBT on the bandwidth during the CAT2 LBT occasion; and
send an indication to the other BS that the BS has occupied the bandwidth.

* * * * *